United States Patent Office

3,113,958
Patented Dec. 10, 1963

---

3,113,958
N-VINYL PHOSPHORAMIDOTHIOATES AND METHOD FOR PREPARING SAME
Bernard Miller, Princeton, and Thomas P. O'Leary, Jr., Cranbury, N.J., assignors to American Cyanamid Company, Stamford, Conn., a corporation of Maine
No Drawing. Filed Oct. 1, 1962, Ser. No. 227,536
10 Claims. (Cl. 260—461)

This invention relates to phosphoramidothioates and to processes for their preparation. More particularly, the invention relates to N-vinyl phosphoramidothioates and has for its principal objects the preparation of N-vinyl phosphoramidothioates and their use as the active components in insecticidal compositions.

The N-vinyl phosphoramidothioates of the present invention can be represented by the general formula:

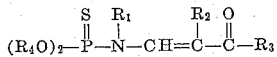

where $R_1$ is hydrogen, lower alkyl or monoaryl, $R_2$ is hydrogen or halogen, such as chloro, bromo or iodo, $R_3$ is lower alkyl or alkoxy and $R_4$ is lower alkyl. The N-vinyl phosphoramidothioates hereinabove defined find utility in insecticidal compositions.

Advantageously, the N-vinyl phosphoramidothioates can be conveniently prepared by reacting substantially equimolar proportions of a phosphoramidothioate and a β-halogen vinyl ketone or ester in the presence of a strong base, such as an alkali metal alkoxide, at temperatures ranging from ordinary room temperature to as high as 80° C.

The phosphoramidothioate reactant contemplated herein is represented by the formula:

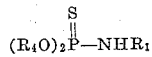

where $R_1$ and $R_4$ have the same values as above.
Illustrative phosphoramidothioates are:

O,O-diethyl N-phenyl phosphoramidothioate,
O,O-diethyl N-methyl phosphoramidothioate,
O,O-dimethyl N-ethyl phosphoramidothiate,
O,O-diisopropyl N-tolyl phosphoramidothioate,
O,O-diethyl phosphoramidothioate, and
O,O-di-n-butyl-N-isopropyl phosphoramidothioate.

The aforementioned β-halo vinyl carbonyl reactant can be defined as having the structure:

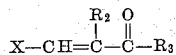

where $R_2$ is hydrogen or a halogen atom, such as fluoro, chloro, bromo or iodo, $R_3$ is a lower alkyl, such as methyl, ethyl, propyl or butyl, isomers or homologs thereof, or lower alkoxy, such as methoxy, ethoxy, propoxy and butoxy. Exemplary β-halo vinyl carbonyl compounds are:

Ethyl α,β-dichloroacrylate,
Methyl β-chloro-vinyl ketone,
Propyl β-bromo-vinyl ketone,
t-Butyl β-iodo-vinyl ketone,
Propyl α,β-dibromoacrylate, isomers and homologs of the same.

As stated previously, the reaction between the phosphoramidothioate and the β-halo vinyl carbonyl compound is carried out in the presence of a strong base. Contemplated strong bases are: alkali metal alkoxides containing at least two carbon atoms, such as sodium ethoxide, potassium ethoxide and potassium tert. butoxide. Advantageously, the strong base is dissolved in an inert polar organic solvent, such as t-butanol, dimethyl formamide or dimethoxy ethane. Sufficient strong base, usually about one mol of the base per mol of reactant, is added to form the anion of the corresponding phosphoramidothioate.

In order to facilitate a further understanding of the invention, the following examples are presented primarily for the purpose of illustrating certain more specific details thereof. The scope of the invention is not to be deemed limited thereby except as defined in the claims. Unless otherwise stated, the parts are by weight.

EXAMPLE 1

*Preparation of Ethyl 2-Chloro 3-(N-Phenyl) O,O-Diethyl Phosphorothioamidyl Acrylate*

To a suitable reaction vessel containing a solution of O,O-diethyl N-phenyl phosphoramidothioate (9.80 parts) in 10 parts of dimethyl formamide is added a solution of potassium t-butoxide (5.37 parts) in 150 parts of dimethyl formamide. Ethyl 2,3-dichloroacrylate (8.11 parts) is added and the solution is stirred for thirty minutes. Methylene chloride (150 parts) is then added and the solution is washed several times with water and dried over magnesium sulfate.

Evaporation of the solvent leaves 14.2 parts, or 73 percent, of a crude brown product. The latter is next purified by vapor phase chromatography on neutral alumina to obtain a yellow liquid. On analysis, the following is obtained in percent for the latter pure ethyl 2-chloro 3-(N-phenyl) O,O-diethyl phosphorothioamidyl acrylate liquid:

Calculated: C, 47.68; H, 5.60; N, 3.71; S, 8.49; P, 8.20; Cl, 9.38. Found: C, 47.56; H, 5.82; N, 3.92; S, 8.50; P, 8.16; Cl, 9.34.

EXAMPLE 2

*Preparation of Methyl (β-[O,O-Diethyl N-Methyl Phosphorothioamidyl]) Vinyl Ketone*

A solution of O,O-diethyl N-methyl phosphoramidothioate (7.70 parts) in dimethyl formamide (10 parts) is added to a solution of potassium t-butoxide (5.60 parts) in 150 parts of dimethyl formamide. A solution of methyl β-chloro vinyl ketone (5.27 parts) in 10 parts of dimethyl formamide is next added. After stirring for one-half hour, methylene chloride (150 parts) is added, and the solution is washed several times with water and dried over magnesium sulfate. The latter is filtered off, the solvent evaporated, and the product distilled at 10μ pressure to yield about 31 percent of methyl (β-[O,O-diethyl N-methyl phosphorothioamidyl]) vinyl ketone having a boiling point between 112° C. and 113° C. The product is further purified by chromatography on alumina to obtain a yellow liquid. On analysis, the following data is found:

Calculated for $PSNO_3C_9H_{18}$.—C, 43.01; H, 7.22; N; 5.57; S, 12.76; P, 12.32. Found: C, 43.19; H, 7.15; N, 5.69; S, 12.71; P, 12.29.

EXAMPLE 3

*Preparation of Ethyl 2-Chloro 3-(N-Methyl) O,O-Diethyl Phosphorothioamidyl Acrylate*

In a suitable reaction vessel containing a solution of O,O-diethyl N-methyl phosphoramidothioate (3.15 parts) in dimethyl formamide (10 parts) is added a solution of potassium t-butoxide (2.32 parts) in dimethyl formamide (150 parts). Ethyl 2,3-dichloroacrylate (3.50 parts) is added and the solution is stirred for thirty minutes. Methylene chloride (150 parts) is next added. Resultant solution is washed several times with water and dried over magnesium sulfate. Filtration of the latter and evaporation of the solvent leaves 4.9 parts of crude ethyl 2-chloro 3-(N-methyl) O,O-diethyl phosphorothioamidyl acrylate.

The product is purified by chromatography on neutral alumina. On analysis, the following data is recorded:

Calculated for $PNSO_4ClC_{10}H_{19}$.—C, 40.07; H, 6.39; N, 4.67; S, 10.70; P, 11.83; Cl, 10.33. Found: C, 39.80; H, 6.89; N, 4.63; S, 10.61; P, 11.84; Cl, 10.21.

EXAMPLE 4

*Preparation of Ethyl 2-Chloro O,O-Diethyl Phosphorothioamidyl Acrylate*

To a suitable reaction vessel containing O,O-diethyl phosphoramidothioate (10.14 parts) in dimethyl formamide (15 parts, by volume) is added a solution of potassium t-butoxide (7.72 parts) in 50 parts of dimethyl formamide. Ethyl α,β-dichloroacrylate (5.07 parts) in dimethyl formamide (10 parts) is added. After fifteen minutes, potassium t-butoxide (6.72 parts) is added followed by 50 parts by volume of dimethyl formamide and then 5.07 parts of ethyl 2,3-dichloroacrylate in 10 parts of dimethyl formamide. After stirring for one hour, 150 parts of methylene chloride are added. Resultant solution is washed twice with water. Aqueous washings are acidified with dilute hydrochloric acid and extracted with methylene chloride. The methylene chloride solution is dried over magnesium sulfate and evaporated to yield 3.8 parts or 21 percent of brown liquid which is shown by vapor phase chromatography analysis to be 91 percent pure ethyl 2-chloro O,O-diethyl phosphorothioamidyl acrylate. The product is distilled at 20μ pressure. Upon analysis, the following data is obtained for $PSNClO_4C_9H_{17}$:

Calculated.—C, 35.83; H, 5.68; N, 4.64; S, 10.63; Cl, 11.75; P, 10.26. Found: C, 35.99; H, 5.90; N, 4.86; S, 10.88; Cl, 11.83; P, 10.27.

EXAMPLE 5

To illustrate the insecticidal activity of the compounds of the subject invention, the following tests are run and the results recorded in Table I below:

The compounds to be tested are made up as 0.1% solutions in 65% acetone/35% water. Three inch pots containing two or three Nasturtium plants two inches tall are infested two days before they are selected for testing. The pots are placed on a turntable maintained at four revolutions per minutes and sprayed for two revolutions with a #15 De Vilbiss Atomizer at twenty pounds per square inch air pressure. The spray tip is held about six inches from the plants and the spray is directed so as to give complete coverage of the aphids and the plants. The sprayed plants are laid on their side on white enamel trays (9½″ x 13¼″ x ¾″) which have had the edges coated with No. 50 S.A.E. oil as a barrier. Mortality counts are made after holding for two days at 70° F. and the results in percent are recorded in Table I below:

TABLE I.—APHIDS TEST

| Compound: | Percent kill |
|---|---|
| Methyl (β-[O,O-diethyl N-methyl phosporothioamidyl] vinyle ketone | 95 |
| Ethyl 2-chloro 3-(N-phenyl) O,O-diethyl phosphorothioamidyl acrylate | 98 |
| Ethyl 2-chloro 3-(N-methyl O,O, diethyl phosphorothioamidyl arcrylate | 100 |
| Ethyl 2-chloro O,O-diethyl phosphorothioamidyl acrylate | 98 |

We claim:

1. Compounds represented by the formula:

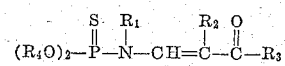

where $R_1$ is a radical selected from the group consisting of hydrogen, lower alkyl, phenyl and lower alkyl substituted phenyl, $R_2$ is a radical selected from the group consisting of hydrogen and halogen, $R_3$ is a radical selected from the group consisting of lower alkyl and lower alkoxy, and $R_4$ stands for lower alkyl.

2. The compound: ethyl 2-chloro 3-(N-phenyl) O,O-diethyl phosphorothioamidyl acrylate.

3. The compound: ethyl 2-chloro 3-(N-ethyl) O,O-diethyl phosphorothioamidyl arcrylate.

4. The compound: ethyl 2-chloro O,O-diethyl phosphorothioamidyl acrylate.

5. The compound: methyl(β-[O,O-diethyl N-methyl phosphorothioamidyl]) vinyl ketone.

6. The process for preparing a N-vinyl phosphoramidothioate of the formula:

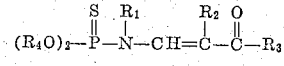

where $R_1$ is a radical selected from the group consisting of hydrogen, lower alkyl, phenyl and lower alkyl substituted phenyl, $R_2$ is a radical selected from the group consisting of hydrogen and halogen, $R_3$ is a radical selected from the group consisting of lower alkyl and lower alkoxy, and $R_4$ stands for lower alkyl, which comprises the steps of: bringing into reactive combination in substantially equimolar quantities a phosphoramidothioate reactant of the formula:

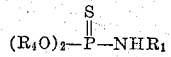

and a β-halo vinyl carbonyl compound having the formula:

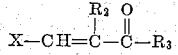

where $R_1$, $R_2$, $R_3$ and $R_4$ have the same values as defined above, and X stands for a halogen atom in the presence of a strong base, and recovering resultant N-vinyl phosphoramidothioate.

7. The process according to claim 6, wherein the thioate reactant is O,O-diethyl N-phenyl phosphoramidothioate and the vinyl reactant is ethyl 2,3-dichloroacrylate.

8. The process according to claim 6, wherein the thioate reactant is O,O-diethyl N-methyl phosphoramidothioate and the vinyl reactant is methyl β-chloro vinyl ketone.

9. The process according to claim 6, wherein the thioate reactant is O,O-diethyl N-methyl phosphoramidothioate and the vinyl reactant is ethyl 2,3-dichloroacrylate.

10. The process according to claim 6, wherein the thioate reactant is O,O-methyl phosphoramidothioate and the vinyl reactant is ethyl 2,3-dichloroacrylate.

No references cited.